United States Patent
Feng

(10) Patent No.: US 9,594,228 B1
(45) Date of Patent: Mar. 14, 2017

(54) THERMAL COMPENSATION TO ADJUST CAMERA LENS FOCUS

(71) Applicant: GoPro, Inc., San Mateo, CA (US)

(72) Inventor: Chen Feng, Snohomish, WA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/839,881

(22) Filed: Aug. 28, 2015

(51) Int. Cl.
*G02B 7/28* (2006.01)
*H04N 5/225* (2006.01)
*G02B 7/02* (2006.01)

(52) U.S. Cl.
CPC ........... *G02B 7/028* (2013.01); *H04N 5/2253* (2013.01); *H04N 5/2254* (2013.01)

(58) Field of Classification Search
CPC ..... G02B 7/021; G02B 7/028; H04N 5/23212
USPC .......... 396/532, 529, 530, 531, 533
See application file for complete search history.

(56) References Cited

U.S. PATENT DOCUMENTS

2010/0001071 A1* 1/2010 Ohara ................ G02B 7/021
235/454

* cited by examiner

*Primary Examiner* — Rochelle-Ann J Blackman
(74) *Attorney, Agent, or Firm* — Fenwick & West LLP

(57) ABSTRACT

An integrated image sensor and a camera lens apparatus comprising of an image sensor substrate, a camera lens mount, a lens barrel, a lens optical assembly and a collet. The camera lens mount comprises a first material, the lens barrel comprises a second material and the collet comprises a third material, the first, second and third materials change in length with a temperature change according to their respective coefficient of thermal expansion. The lens optical assembly comprises optical elements that cause a change in focal length with a temperature change according to a thermal optical coefficient. The first, second, and third material, the lengths of the camera lens mount, lens barrel, and collet, and the thermal optical coefficient of the lens optical assembly are such that the image plane is approximately stationary relative to the sensor surface in response to the temperature change.

18 Claims, 2 Drawing Sheets

THERMAL COMPENSATION TO ADJUST CAMERA LENS FOCUS

BACKGROUND

Technical Field

This disclosure relates to a camera mount system, and more specifically, to a passive thermal compensation mechanism for adjusting focus in a camera lens system.

Description of the Related Art

In an integrated image sensor and camera lens system a lens mount is connected to a lens barrel via a collet such that the image sensor is aligned to maintain lens focus. The materials used for the camera lens mount, lens barrel, and collet may expand or contract due to changes in temperature of the lens assembly. Additionally, the lens optical elements inside the lens barrel can increase or decrease the focal length of the lens due to changes in temperature. The expansion or contraction of any of the components, along with the change in the focal length may cause the positions of the lenses to shift along the optical axis, thus altering the distance between the lenses and the image sensor. This affects the focus of the lenses and compromises performance and yield.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiment is an integrated image sensor and a camera lens apparatus that includes a method of thermal compensation to adjust the focus of the camera lens. The apparatus includes an image sensor, a camera lens mount comprising a first material that changes in length with the temperature change according to the material's coefficient of thermal expansion, a lens barrel comprising a second material that changes in length with the temperature change according to the material's coefficient of thermal expansion, a lens optical assembly secured by the lens barrel, the lens optical assembly comprises optical characteristics that cause a change in focal length with the temperature change according to a thermal optical coefficient. The apparatus further includes a collet that connects the lens barrel and the camera lens mount, the collet comprising a third material that changes in length with the temperature change according to the material's coefficient of thermal expansion. The collet is structured in a manner such that the change in the length of the collet compensates for the change in the lengths of the lens mount, the lens barrel and the lens optical assembly in order to keep the image plan approximately stationary and in focus in response to the temperature change.

Figure 1:
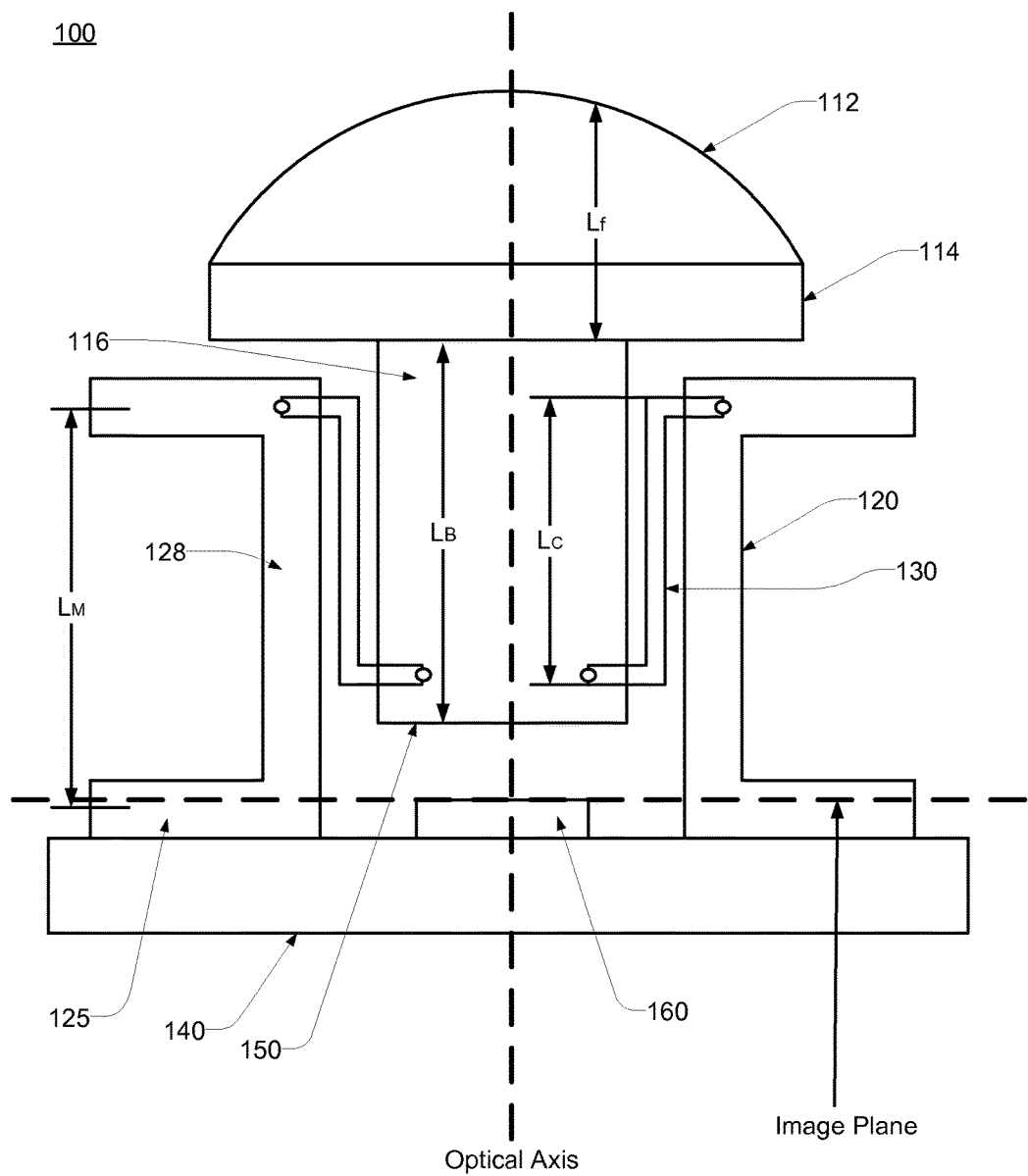
FIG. 1 illustrates an integrated image sensor and camera lens system, according to one embodiment.

Turning now to FIG. 1, it illustrates an embodiment of an integrated image sensor and lens assembly 100 that includes a camera lens barrel 150, a camera lens mount 120, a collet 130 and an image sensor substrate 140. The image sensor substrate 140 has an image sensor 160 (e.g., a high-definition image sensor) for capturing images and/or video. For accurate focus, the image sensor 160 lies on an image plane 160. The camera lens mount 120 physically couples with the image sensor substrate 140 and couples to the camera lens barrel 150 via the collet 130.

In one embodiment, different portions of the camera lens mount 120 can be made of different types of material (e.g. brass, aluminum, plastic, etc.). Each material may have a different coefficient of thermal expansion defining how the material expands or contracts with change in temperature. The linear expansion coefficient indicates the change in length of an object due to the change in temperature and is given by the following equation:

$$\alpha_L = 1/L (dL/dT) \quad (1)$$

where L is the length of the object and dL/dT is the rate of change in the linear dimension per unit change in temperature.

The camera lens mount 120 comprises a base portion 125 and a tube portion 128. The base portion 125 includes a bottom surface in a plane substantially parallel to a surface of the image sensor substrate 140. The tube portion 128 of the lens mount 120 extends away from the image sensor assembly along the optical axis and includes a substantially cylindrical channel for receiving the lens barrel 150.

The lens barrel 150 comprises one or more lenses or other optical components to direct light to the image sensor 160. The lower portion of the lens barrel 116 is substantially cylindrical and structured to at least partially extend into the channel of the tube portion 128 of the camera lens mount 120. The lens arms 114 extend radially from the body of the lens barrel 150 and are outside the channel of the lens mount 120 when assembled. The lens barrel 150 comprises a lower portion 116 and one or more barrel arms 114. The lens optical assembly 112 includes optical components (e.g. one or more lenses) to enable external light to enter the lens barrel 150 and be directed to the image sensor assembly 130. The optical components of the lens optical assembly 112 are generally positioned along the optical axis at various distances from the image plane and may include elements external to the barrel 150 or internal elements (not shown in the figure).

The lower portion 116 and barrel arms 114 may be made of different material (e.g., brass, aluminum, plastic, etc.) having different coefficients of thermal expansion. The lens barrel 150 further includes a lens optical assembly 112 that may be made of a material such as optical glass or plastic.

The material of the lens optical assembly 112 may also have a coefficient of thermal expansion different than the coefficients of thermal expansion for other portions of the integrated sensor and lens assembly 100.

The collet physically couples the lens barrel 150 to the camera lens mount 120. The collet may be made of, for example, brass, aluminum, plastic, or other material.

Thermal Compensation

Figure 2:
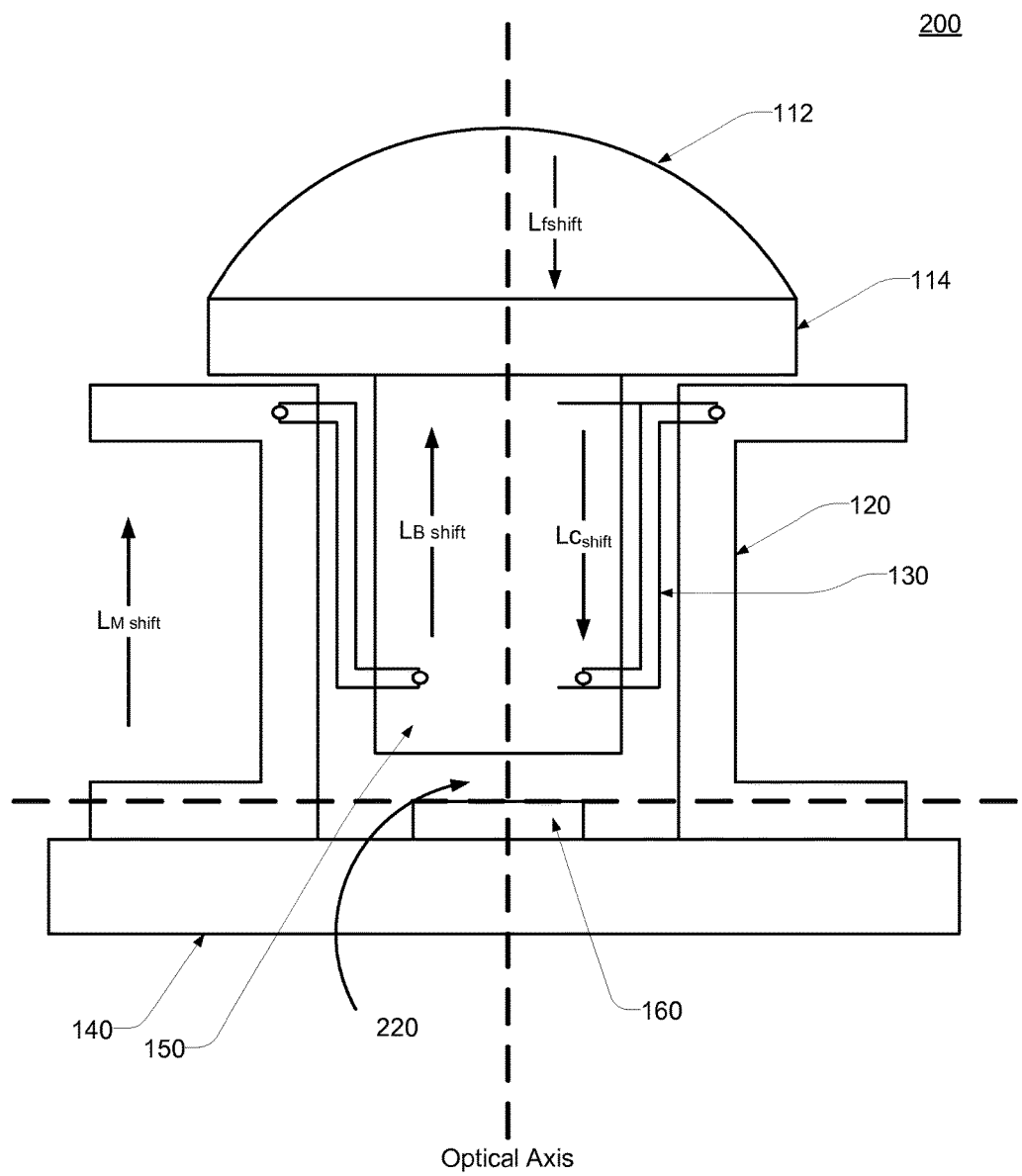
FIG. 2 illustrates the shift of various components of the system to change in temperature, according to one embodiment.

FIG. 2 illustrates the effect of an increase in temperature on each of the lens barrel 150, the lens mount 120, the collet 130, and the optical lens assembly 112. The integrated sensor and lens assembly 100 may experience a change in temperature due to, for example, external weather or heating from use of the camera. A change in temperature causes the materials of the lens barrel 150, camera lens mount 120 and the collet 130 to expand or contract. Expansion or contraction of these components shifts the position of the lens or lenses relative to the image sensor 160 which can cause defocus of the image. Furthermore, temperature change in the lens optical assembly 112 causes expansion or contraction of its materials as well as a change in distances between the lens elements, which can further affect the overall focal length.

The materials for the lens mount 120 and lens barrel 150 generally have a positive coefficient of thermal expansion (CTE), thereby causing the lens mount 120 and the lens barrel 150 to expand with an increase in temperature and move the lens optical assembly 112 away from the image sensor, thereby contributing to an increase in the effective focal length with an increase in temperature. The collet 130 may also have a positive CTE and therefore expands with an increase in temperature. Due to the structure of the collet 130, this expansion moves the lens optical assembly 112 towards the image sensor, 160, thereby contributing to a decrease in the effective focal length.

The lens optical assembly 112 typically has a negative thermal optical coefficient in which the net effect of a temperature increase on the lens optical assembly 112 generally contributes to a decrease in the effective focal length.

To avoid lens defocus due to thermal effects, the materials for each of the lens barrel 150, collet 130, lens optical assembly 112 and the lens mount 120 are selected based on the following equation:

$$\Delta = (L_m \cdot CTE_m \cdot \Delta T) - (L_c \cdot CTE_c \cdot \Delta T) + (L_B \cdot CTE_B \cdot \Delta T) - (L_f CTE_f \Delta T) \quad (2)$$

where $\Delta$ is the change in the distance between the lens focal plane and the image sensor, $L_m$ is the length of the lens mount, $CTE_m$ is the coefficient of thermal expansion of the lens mount material, $L_c$ is the length of the collet, $CTE_c$ is the coefficient of thermal expansion of the collet material, $L_B$ is the length of the lens barrel, $CTE_B$ is the coefficient of thermal expansion of the lens barrel material, $L_f$ is the effective focal length of the lens optical assembly, $CTE_f$ is the thermal optical coefficient representing the change of the lens focal length in the lens optical assembly for a change in temperature, and $\Delta T$ is the change in temperature.

To minimize or eliminate defocus caused by temperature change, the materials and dimensions of the collet 130, lens mount 120, the lens barrel 150 and the optical characteristics of the lens optical assembly 112 are chosen such that $\Delta$ is zero or approximately zero. For example, in one embodiment, $\Delta$ for a given temperature change is within a predefined tolerance of zero representing an acceptable level of defocus to one of skill in the art (e.g., within 1% tolerance, 2% tolerance, 5% tolerance, etc.). Because the characteristics of the lens mount 130, lens barrel 150, and lens optical assembly 112 are often dictated by other design constraints of the camera 200, the most flexibility may exist in choosing the material and dimensions of the collet 130 to balance the thermal effects of the other components. For example, the material for the collet 130 is selected with a $CTE_c$ such that $(L_c \cdot CTE_c \cdot \Delta T)$ has a same amount of change at temperature $\Delta T$ as the net change caused by the other components at temperature $\Delta T$. For example, in one embodiment the ideal collet material and length are given by:

$$L_c \cdot CTE_c = L_m \cdot CTE_m + L_B \cdot CTE_B - L_f CTE_f \quad (3)$$

In an example, embodiment, the thermal coefficient for the mount $CTE_m$ may be around 5-20 ppm per degree C. An example material may be a metal or plastic. The barrel material is generally is selected to have good precision and manufacturability for the lens optical element assembly. The barrel $CTE_B$ material may be around 30 to 50 ppm per degree C. in one embodiment. An example material for the barrel 150 is injection mold plastic. The optical materials for the lens optical elements 112 are selected based on the best optical performance in terms of resolution and aberrations. The lens optical materials 112 generally includes glass lens elements and may have an thermal optical coefficient $CTE_f$ of approximately −10 to −20 ppm per degree C. in one embodiment. Presuming these characteristics of the other components, the collet length is selected such that it compensates for the net effect on focal length due to thermal expansion of the three other components. The material chosen for the collet may have a much higher $CTE_c$ than the CTEs of the other components. For example, the thermal coefficient for the collet $CTE_c$ may be around 100 ppm per degree C. or higher in one embodiment. An example material is a plastic material with high CTE.

The thermal focus shift can be adjusted to stay within a predetermined threshold range. To achieve this fine tuning of the thermal focus shift within the threshold range, the connecting point of the collet to the barrel is adjusted.

In other alternative embodiments, other materials may be used with different CTEs that could include either positive or negative CTEs. Effectively, the materials and dimensions are selected such that the net change in focal length caused by thermal effects of the lens mount, lens barrel and the lens optical assembly is approximately zero.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. An integrated image sensor and a camera lens apparatus comprising:
    an image sensor substrate comprising an image sensor on an image plane;
    a camera lens mount comprising a first material that expands in length with an increase in temperature according to a first positive coefficient of thermal expansion, the camera lens mount comprising:
        a base portion including a lower surface adjacent to the image sensor substrate; and
        a tube portion extending from the base portion in a direction of an optical axis substantially perpendicular to the image plane, the tube portion having a channel;
    a lens barrel having a first portion extending into the channel of the tube portion, and a second portion outside the channel of the tube portion, the lens barrel comprising a second material that expands in length with the increase in temperature according to a second positive coefficient of thermal expansion;
    a lens optical assembly secured by the lens barrel, the lens optical assembly comprising optical characteristics that cause a negative change in focal length with the increase in temperature according to a negative thermal optical coefficient;
    a collet connecting the interior surface of the camera lens mount and an exterior surface of the lens barrel, wherein the interior surface of the lens mount, the collet and the exterior surface of the lower portion of the lens barrel are each longitudinally oriented in a direction substantially parallel to the optical axis, the collet to couple the lens barrel to the camera lens mount, the collet comprising a third material that expands in length with the increase in temperature according to a third positive coefficient of thermal expansion;
    wherein the first material, second material, third material, lengths of the camera lens mount, lens barrel, and collet, and the thermal optical coefficient of the lens optical assembly are such that the focal plane is maintained in approximate alignment with the image plane in response to the increase in temperature.

2. The integrated image sensor and a camera lens apparatus of claim 1, wherein a change in length of the collet with the increase in temperature is approximately equal in magnitude to a sum of changes in length of the camera mount, the lens barrel and the effective focal length of the lens optical assembly with the increase in temperature.

3. The integrated image sensor and a camera lens apparatus of claim 1, wherein a change in length of the collet with the increase in temperature moves the lens optical assembly towards the image sensor.

4. The integrated image sensor and a camera lens apparatus of claim 1, wherein a change in length of the lens barrel with the increase in temperature moves the lens optical assembly away from the image sensor.

5. The integrated image sensor and a camera lens apparatus of claim 1, wherein a change in length of the lens mount with the increase in temperature moves the lens optical assembly away from the image sensor.

6. The integrated image sensor and camera lens apparatus of claim 1, wherein the first positive coefficient of thermal expansion for the camera lens mount is in a range of 5 to 20 parts per million per degree Celsius.

7. The integrated image sensor and camera lens apparatus of claim 1, wherein the second positive coefficient of thermal expansion for the lens barrel is in a range of 30 to 50 parts per million per degree Celsius.

8. The integrated image sensor and camera lens apparatus of claim 1, wherein the third positive coefficient of thermal expansion for the collet is approximately 100 parts per million per degree Celsius.

9. The integrated image sensor and camera lens apparatus of claim 1, wherein the negative thermal optical coefficient of the lens optical assembly is in a range of −10 to −20 parts per million per degree Celsius.

10. A camera comprising:
    an image sensor substrate comprising an image sensor on an image plane, the image sensor for capturing images or video;
    a camera lens mount comprising a first material that expands in length with an increase in temperature according to a first positive coefficient of thermal expansion, the camera lens mount comprising:
        a base portion including a lower surface adjacent to the image sensor substrate; and
        a tube portion extending from the base portion in a direction of an optical axis substantially perpendicular to the image plane, the tube portion having a channel;
    a lens barrel having a first portion extending into the channel of the tube portion, and a second portion outside the channel of the tube portion, the lens barrel comprising a second material that expands in length with the increase in temperature according to a second positive coefficient of thermal expansion;
    a lens optical assembly secured by the lens barrel for directing to the image sensor, the lens optical assembly comprising optical characteristics that cause a negative change in focal length with the increase in temperature according to a negative thermal optical coefficient;
    a collet connecting the interior surface of the camera lens mount and an exterior surface of the lens barrel, wherein the interior surface of the lens mount, the collet and the exterior surface of the lower portion of the lens barrel are each longitudinally oriented in a direction substantially parallel to the optical axis, the collet to couple the lens barrel to the camera lens mount, the collet comprising a third material that expands in length with the increase in temperature according to a third positive coefficient of thermal expansion;

wherein the first material, second material, third material, lengths of the camera lens mount, lens barrel, and collet, and the thermal optical coefficient of the lens optical assembly are such that the focal plane is maintained in approximate alignment with the image plane in response to the increase in temperature.

11. The camera of claim 10, wherein a change in length of the collet with the increase in temperature is approximately equal in magnitude to a sum of changes in length of the camera mount, the lens barrel and the effective focal length of the lens optical assembly with the increase in temperature.

12. The camera of claim 10, wherein a change in length of the collet with the increase in temperature moves the lens optical assembly towards the image sensor.

13. The camera of claim 10, wherein a change in length of the lens barrel with the increase in temperature moves the lens optical assembly away from the image sensor.

14. The camera of claim 10, wherein a change in length of the lens mount with the increase in temperature moves the lens optical assembly away from the image sensor.

15. The camera of claim 10, wherein the first positive coefficient of thermal expansion for the camera lens mount is in a range of 5 to 20 parts per million per degree Celsius.

16. The camera of claim 10, wherein the second positive coefficient of thermal expansion for the lens barrel is in a range of 30 to 50 parts per million per degree Celsius.

17. The camera of claim 10, wherein the third positive coefficient of thermal expansion for the collet is approximately 100 parts per million per degree Celsius.

18. The camera of claim 10, wherein the negative thermal optical coefficient of the lens optical assembly is in a range of −10 to −20 parts per million per degree Celsius.

* * * * *